RICHARD COLBURN, OF NORWICH, CONNECTICUT.

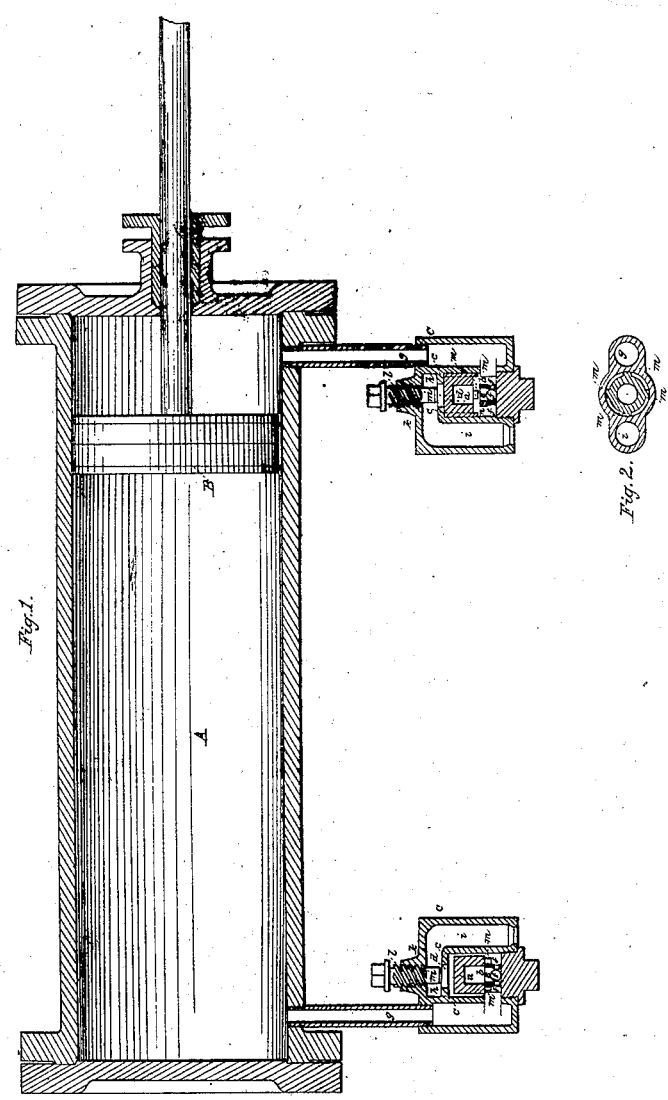

Letters Patent No. 65,646, dated June 11, 1867.

---

IMPROVEMENT IN STEAM-TRAPS.

---

The Schedule referred to in these Letters Patent and making part of the same.

---

TO ALL PERSONS TO WHOM THESE PRESENTS SHALL COME:

Be it known that I, RICHARD COLBURN, of Norwich, in the county of New London, and State of Connecticut, have invented an improved Steam-Trap or apparatus to be applied to the cylinder of a steam engine for the purpose of freeing it of condensed steam and its piston from back pressure of exhaust steam; and I do hereby declare the said invention to be fully described in the following specification, and represented in the accompanying drawings, of which—

Figure 1 exhibits a longitudinal section of a cylinder and its piston with my invention applied to the cylinder at or near each end thereof.

Figure 2 will be hereinafter referred to and described.

My present invention is designed to accomplish the objects or purposes of that for which Letters Patent were granted to myself and H. W. Hanson on May 20, 1856, and subsequently reissued on the 7th day of February, 1865. With my present invention I have means by which the valve, or both of them, when in conjunction with the cylinder, can be kept open or off their seat or seats, in order that, at the starting of the engine, any condensed steam or water in the cylinder may be quickly and thoroughly blown off or discharged therefrom. Furthermore, the valve of my said apparatus is so arranged with respect to its seat and induction and eduction passages that it will close under pressure of the steam, and, when relieved therefrom, will open or fall away from its seat by its own weight or gravity.

In the drawing, A denotes the steam-engine cylinder, and B its piston. The trap at each end of and beneath the cylinder is shown at C. The valve $a$ of the trap is placed within a chamber, $b$, having the valve-seat $c$ at its top, and a hole or passage, $d$, leading through the seat. The valve plays freely in vertical directions within the chamber, and, when in its lowest position, rests on a hollow or tubular projection, $e$, having one or more holes $f$ formed laterally on it. The cylinder is connected with the valve-chamber by means of a conduit or passage, $g$, opening out of the cylinder and into the lower part of the valve-chamber. Over the valve-seat is a chamber, $h$, out of which an eduction passage or conduit, $i$, leads. The valve-chamber, valve, the seat of the valve, and the induction and eduction passages are arranged in a block or case, through whose top $k$ (which also constitutes the top of the chamber $h$) a screw, $l$, is screwed. The shank $m'$ of the screw goes into the opening $d$ of the valve-seat; and, when the screw is screwed down, it will operate to prevent the valve from coming in contact with its seat. The diameter of the shank of the screw is less than that of the hole $d$, in order that there may be a free passage for water to escape through the hole and around the shank. The valve I make with a series of wings, $m\ m\ m\ m$, extending from it, in manner as represented in fig. 1, and also in fig. 2, which is a transverse and horizontal section of the trap. These wings, by bearing against the sides of the valve-chamber, serve to guide the valve in its vertical movements. The spaces between the wings allow the water to pass through the valve-chamber.

When the steam is admitted into either end of the cylinder, in order to impel the piston in one direction, it will enter the valve-chamber in connection with such end, and will force upward and close the valve thereof upon its seat; but when the steam enters the cylinder, in order to impel the piston in the opposite direction, the valve, in consequence of the exhaust of the steam, will be free to fall away from its seat, and its weight will cause it to do so. The waste water or condensed steam will then be free to discharge through and out of the valve-chamber and the passage through the valve-seat, and into the chamber $h$, and thence through the eduction passage. I would remark that I intend to apply to each screw $l$ of the pair of traps of a cylinder a crank-arm or lever, to extend from the head of the screws; also, to connect these arms by a rod or bar, so as to enable both screws to be operated or moved simultaneously.

I do not claim the combination of two steam-traps with a cylinder and piston; nor do I herein claim the invention as described and claimed in the patent hereinbefore mentioned. What I claim as my present invention, is—

The arrangement of the valve, its case, and induction and eduction passages substantially in manner as described, in order that the valve, when in use with a cylinder and piston as explained, will be closed by the pressure of steam, and, when relieved therefrom, will be opened by its own weight, the whole being in manner and under circumstances as explained.

I also claim the combination of the screw $l$, or its equivalent, with the valve, its seat, chamber, and induction and eduction passages, arranged substantially as specified.

RICHARD COLBURN.

Witnesses:
R. H. EDDY,
F. P. HALE, Jr.